United States Patent [19]

Sterlini

[11] 4,089,660
[45] May 16, 1978

[54] PROCESS FOR CONTACTING A GAS WITH A LIQUID

[75] Inventor: Jacques Sterlini, Paris, France

[73] Assignee: Compagnie Electro-Mecanique, Paris, France

[21] Appl. No.: 755,198

[22] Filed: Dec. 29, 1976

Related U.S. Application Data

[63] Continuation of Ser. No. 615,107, Sep. 10, 1975, abandoned.

[30] Foreign Application Priority Data

Aug. 27, 1974  France .................................. 74 29309

[51] Int. Cl.$^2$ ................................................. B01F 3/04
[52] U.S. Cl. .................................... 55/93; 210/63 Z; 261/21
[58] Field of Search ................... 261/21, 20, 76, 151, 261/114 R, 116, DIG. 42, DIG. 75, DIG. 54; 210/59–63; 55/93, 25, 48, 44, 45, 51, 53, 55

[56] References Cited

U.S. PATENT DOCUMENTS

| | | | |
|---|---|---|---|
| 3,730,494 | 5/1973 | Sterlini | 261/21 |
| 3,811,663 | 5/1974 | Sterlini | 261/21 |
| 3,867,488 | 2/1975 | Porterfield | 261/DIG. 42 |

FOREIGN PATENT DOCUMENTS

| | | | |
|---|---|---|---|
| 1,546,223 | 10/1968 | France | 261/21 |

*Primary Examiner*—Frank A. Spear, Jr.
*Assistant Examiner*—Benoit Castel
*Attorney, Agent, or Firm*—Burns, Doane, Swecker & Mathis

[57] ABSTRACT

A process to be used systematically for establishing contact between a gas and a liquid such as might, in particular, react together.

The process comprises a series of sequences each comprising effecting the intensive mixing, e.g., the emulsification, of the gas and liquid, expanding the emulsified mixture, separating the gas and liquid and recompressing the liquid. These sequences are in series. Over-all the liquid and the gas move in opposite directions, but within a given sequence the gas moves in the same direction as the liquid.

The invention applies to water treatment by a regenerative gas such as ozone.

5 Claims, 4 Drawing Figures

PROCESS FOR CONTACTING A GAS WITH A LIQUID

This application is a continuation of my parent U.S. patent application, Ser. No. 615,107, filed Sept. 10, 1975, now abandoned.

The invention relates to establishing contact between liquids and gases, in particular for the purpose of achieving a physical or chemical reaction if the gas and liquid so placed in contact may react with each other.

Processes and apparatus for establishing thorough contact between a liquid and a gas are already known, whereby the energy of the gas pumps the liquid. Such processes consist in implementing sequentially the following four operations:

(1) intensive mixing or "emulsification" at a given pressure p of a gas flow and of a liquid flow, the liquid and the gas being made to circulate in two circuits on the whole in opposite directions;

(2) expansion to pressure $p'$ of the mixture thus formed, and acceleration of this mixture;

(3) separation of gas and liquid at pressure $p'$;

(4) recompression of the liquid to a pressure $p''$ to recover the kinetic energy of the jet.

The succession of these four operations is termed "sequence".

This process makes it possible to transfer the expansion work of the gas into the liquid with which it is in contact. Hence the total energy of the liquid is increased by the same amount at the end of the sequence, and pressure $p''$ may be made larger than p by sufficient deceleration of the liquid jet during the fourth operation.

The apparatus for implementing such a process also is known in general: it is termed "sequence equipment" or, for short, "sequence", and consists in placing in series four circuit means corresponding to the four stages of the sequence:

one piece of apparatus achieves the convergence of the gas and liquid flows and comprises known devices by achieving a finely divided gas-liquid mixture (the emulsifier);

nozzle with variable cross-section providing a negative pressure gradient (expansion nozzle);

a free surface separator; and an acceleration section for the liquid jet in a closed channel, followed by a diverging conduit (diffusor).

A particular application of this process and equipment is described in French Pat. No. 1,546,223.

It is, moreover, known that such equipment may be used to achieve thorough contact between the gaseous and liquid phases for the purpose of achieving chemical-physical effects at the level of these exchange surfaces (exchanges of heat or matter). A special case of such processes and corresponding equipment will be found in French Pat. Nos. 70 02 814 and in its addition patent 71 02 535, furthermore in French Pat. No. 71 31 931.

Practically it happens that systematic exchange operations must be carried out between liquid and gaseous phases, for instance to dissolve a gas G, which is a component of a gaseous phase mixture, into a liquid L; it is known that the concentration of gas G in liquid L in equilibrium with the gaseous phase in contact with it is proportional to the partial pressure of gas G in said gaseous phase. If it is desired to deplenish the gaseous phase of gas G, a methodical procedure must be used, wherein the gaseous phase and the liquid evolve in opposing flows.

A similar problem is encountered when a gas is made to react with a liquid. In order to obtain complete reaction and satisfactory yield, achieving a methodical contact between the gaseous and liquid flows will be highly advantageous.

An object of the present invention is the provision of a process for and of an apparatus for establishing in systematical manner a contact between the liquid and gaseous phases and further permitting reactions between reactive gases and liquids.

Most generally, the object of the invention is a process for obtaining systematic thorough contact between a liquid and a gas, in particular when such may react with each other, said process involving the evolution of the gas and liquid in sequences each comprising the four following stages:

(1) emulsification under a certain pressure $p$ of a flow of gas and a flow of liquid;

(2) expansion to pressure $p'$ of the mixture so formed and acceleration of same;

(3) separation of gas and liquid at pressure $p'$;

(4) re-compression of liquid, which is decelerated;

the inventive process being characterized in that overall the liquid and the gas are made to circulate in opposite directions in a plurality of said sequences $S_1, S_2 \ldots S_{i-1}, S_i, S_{i+1} \ldots S_{n-1}, S_n$, the liquid being introduced in the $S_1$ sequence and successively traversing said plurality of sequences by passing from sequence $S_1$ to sequence $S_2$ and so forth until sequence $S_n$, whereas the gas, which is introduced in sequence $S_n$, circulates in over-all manner in the direction opposite to the liquid through said plurality of sequences, and in that in any arbitrary single sequence $S_i$, the gas separated from the liquid in the next sequence $S_{i+1}$ moves in the same sense as the liquid coming from the preceding sequence $S_{i-1}$, during stages $1_i$ and $2_i$ of said sequence $S_i$, whereupon it is separated from the liquid in stage $3_i$ to be introduced in stage $1_{i-1}$ of sequence $S_{i-1}$, and so forth until the gas is separated and evacuated from sequence $S_1$.

Equipment for implementing the process of the invention comprises a plurality of unit sequences each consisting of one emulsifier, one expansion nozzle, one free-surface separator and one diffuser, said equipment being characterized in that the unit sequences are so connected in series that the liquid issuing from one diffusor passes into the emulsifier of the next sequence, the liquid thus finding its way from sequence to sequence, conduits being provided to introduce the gas from the separator of one sequence into the emulsifier of the preceding sequence of the series, the selected direction of circulation being that of the liquid.

One skilled in the art will readily understand that special steps may be taken to implement the process of the invention. For instance, it is clear that part of the gas may be tapped at any point of the gas circuit in order to be evacuated or recycled at a previous stage or even in the $S_n$ sequence. Similarly, a fresh quantity of the same gas, or another gas, may be introduced at any point of the gas circuit. Thus, one may either make use of an additional amount of fresh gas for the purpose of the reaction, one may make use of another gas to obtain an additional reaction and to terminate the treatment.

It will be noted furthermore that the preceding considerations also apply to the liquid. The liquid and the gas assume symmetrical roles in the whole of the operation on account of the very systematic character of latter.

The practical case of dissolving a gas into the liquid phase in order to cause a chemical reaction of said gas in said liquid phase obviously is within the scope of the present invention.

In most cases, the reaction time will be much larger than the transit time of the liquid from one sequence to the next. One may then reduce the number of sequences by interposing a dwell space of such total volume that the dwell-time of the liquid in said capacity be large enough for the consummation, partial or whole, of the chemical reaction, prior to introducing the liquid into the following seqence.

The operational parameters of a facility conforming to the invention depend clearly on the kind of liquid and kind of gas between which the contact is to be established, on their reaction rates, etc. The number of sequences may easily be adapted to the flow-rates of the fluids to be treated.

The invention may be applied in particularly interesting manner to water purification when, for instance, continuous and large amounts of waste water are placed in contact with such regenerative gases of ozone. Reciprocally, fumes may be treated and purified by means of one or several treatmentliquids in a series of sequences set up in conformity with the invention.

The invention will presently be described in greater detail, in relation to the accompanying drawings in which FIG. 1 is a schemmatic showing of the principle of the process of the invention with n sequences;

Figure 1:
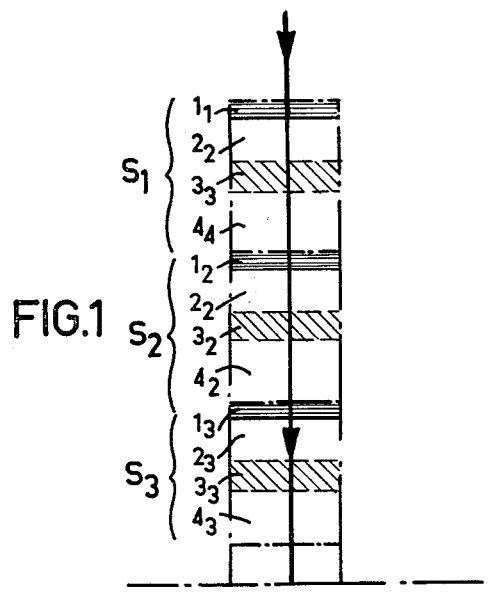
Figure 1:
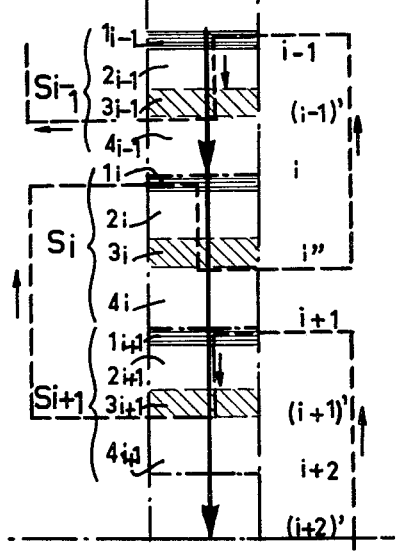
Figure 1:
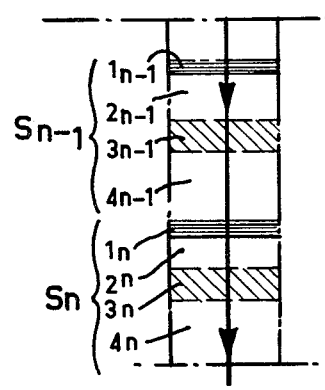
Figure 4:
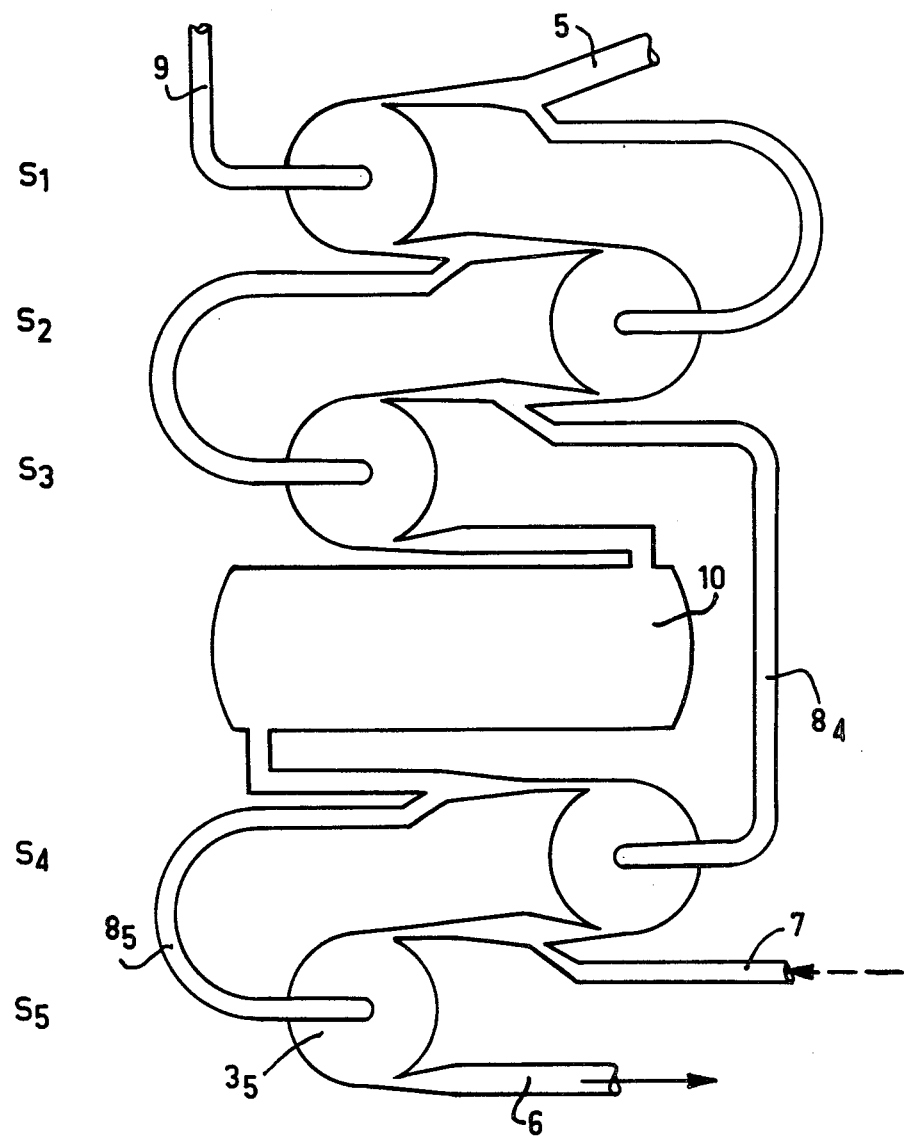

FIG. 4 is a variation of the equipment with capacities between sequences. FIG. 1 shows in diagrammatic form an arrangement of $n$ sequences $S_1, S_2, S_3 \ldots S_{i-1}, S_i, S_{i+1} \ldots S_{n-1}, S_n$; said sequences are shown as ranges or areas inside rectangles drawn in dot-dashed lines. The path of the liquid is shown in solid lines, that of the gas in dotted ones.

Figure 2:
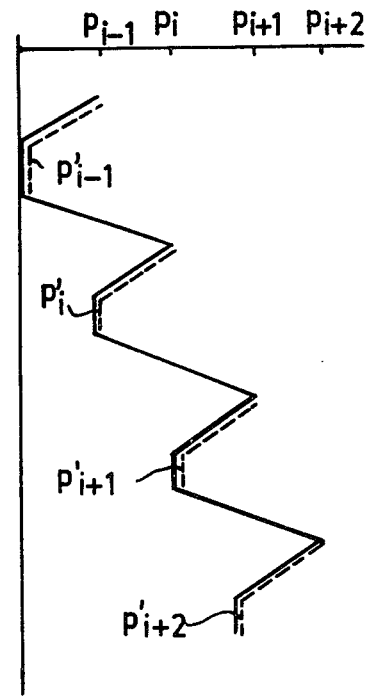
FIG. 2 is a diagram of the pressure changes in a unit sequence of FIG. 1.

The operation of three running contiguous sequences $S_{i-1}, S_i, S_{i+1}$ will presently be described in detail. The liquid and the gas enter sequence $S_{i-1}$ and converge in $1_{i-1}$ to the common pressure $p_{i-1}$. The pressures are shown in FIG. 2 opposite the unit sequences of FIG. 1.

The gas and the liquid form an emulsion in the shaded zone $1_{i-1}$. The emulsion expands along path $2_{i-1}$ to pressure $p'_{i-1}$; then the gas and liquid separate at $3_{i-1}$ (shaded zone); the gas exits sequence $S_{i-1}$ at pressure $p'_{i-1}$; the liquid along its path $4_{i-1}$ increases in pressure to a value $p_i$, whence $$p_i > p_{i-1}.$$

The liquid at pressure $p_i$ then enters sequence $S_i$, forming an emulsion at $1_i$ with the incident gas at the same pressure; the emulsion expands along path $2_i$ to pressure $p'_i$, then the gas exits at $3_i$ from sequence $S_i$ at the same pressure, whereas the liquid along its path $4_i$ increases in pressure to the value of $p_{i+1}$; again, $$p_{i+1} > p_i.$$

Similarly, in sequence $S_{i+1}$, the emulsion formed at $1_{i+1}$ at pressure $p_{i+1}$ following convergence of gas and liquid expands at $2_{i+1}$ to pressure $p'_{i+1}$; then the gas separated from the liquid at $3_{i+1}$ exits sequence $S_{i+1}$ at pressure $p'_{i+1}$ while the liquid recompresses at $4_{i+1}$ to pressure $p_{i+2}$; again $$p_{i+2} > p_{i+1}.$$

Regarding the sequences $S_{i-1}, S_i, S_{i+1}$, the liquid therefore was subjected to the sequel of the following operations $1_{i-1}, 2_{i-1}, 3_{i-1}, 4_{i-1}, 1_i, 2_i, 3_i, 4_i, 1_{i+1}, 2_{i+1}, 3_{i+1}, 4_{i+1}$, etc.

In the same sequences, the gas followed the path $1_{i+1}, 2_{i+1}, 3_{i+1}, 1_i, 2_i, 3_i, 1_{i-1}, 2_{i-1}, 3_{i-1}$, etc. Therefore the gas on the whole ascends the sequences in the opposite direction to the liquid, even though it follows the latter in the same sense successively in each of the sequences, in the order of $S_{i+1}, S_i, S_{i-1}$.

Compatibility of sequence operation requires that $$p_{i-1} = p'_i$$

$$p_i = p'_{i+1}$$

$$p_{i+1} = p'_{i+2} \text{ etc.}$$

and that, preferably $$p_i + p'_{i-1} = 2 p_{i-1}$$

$$p_{i+1} = p'_i = 2p_i \text{ etc.}$$

Considering that the inequalities below are always observed, namely $$p_{i+1} > p_i > p_{i-1} \text{ etc.},$$

the pressure of the liquid increases from sequence to sequence as one goes along with the liquid's travel. Therefore $$p'_{i+2} > p'_{i+1} > p'_i > p'_{i-1} \text{ etc.}$$

The gas expands from sequence to sequence; it is clear the work of expansion of the gas equals the pumping work of the liquid, losses being neglected.

The diagram of FIG. 2 explains the relations between the pressures of the liquid (solid lines) and of the gas (dotted or dashed lines). Pressures $p_{i-1}, p_i, p_{i+1}$ of the liquid are indicated on a horizontal line in the upper part of the diagram for the purpose of clarity. Pressures $p'_{i-1}, p'_i, p'_{i+1}, p'_{i+2}$ of the gas are shown on the diagram proper.

Figure 3:
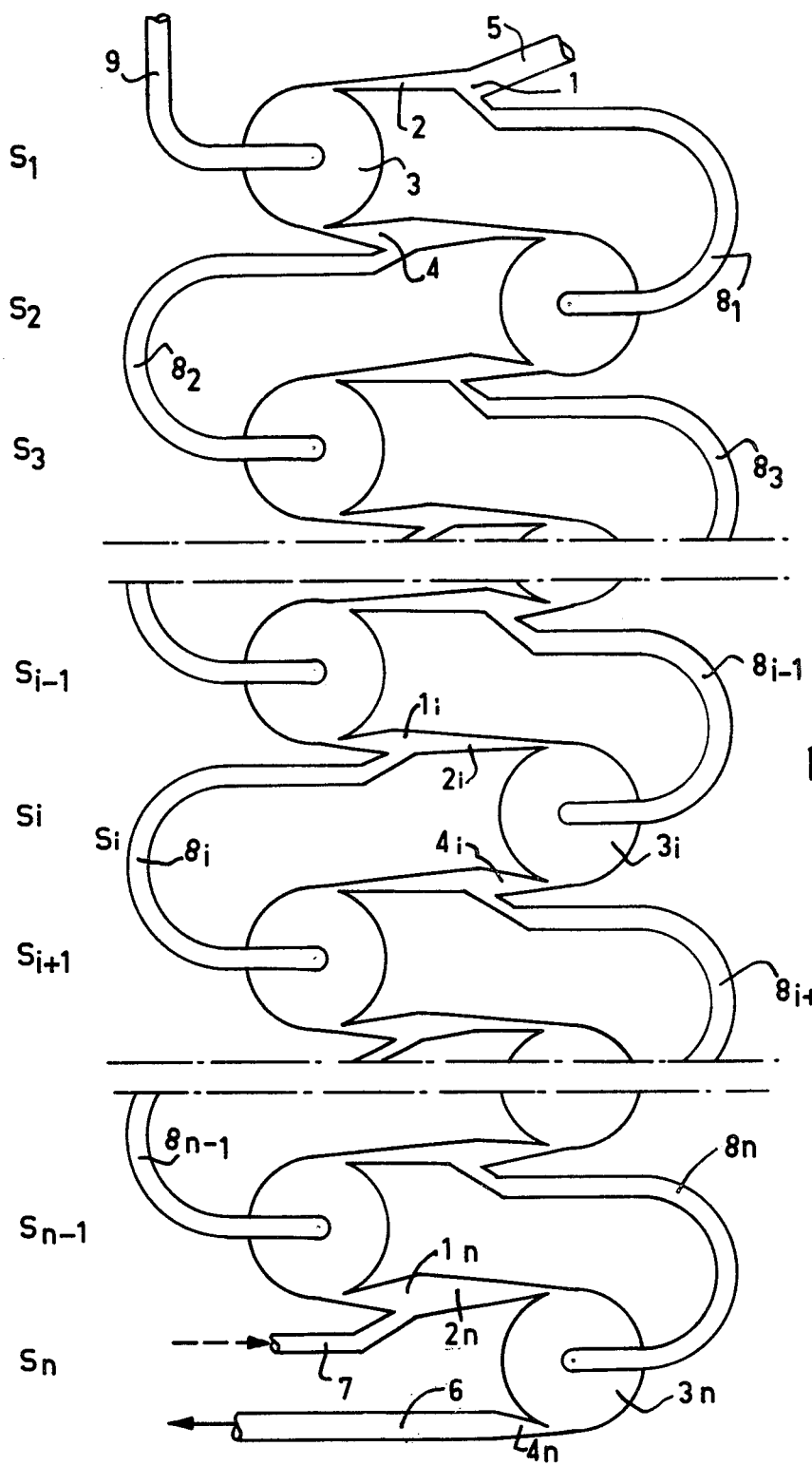
FIG. 3 shows equipment for implementing the process of n sequences of FIG. 1.

FIG. 3 shows an embodiment of the equipment to implement the process illustrated in FIG. 1.

For greater clarity, FIG. 3 shows the same number of sequences as FIG. 1, each comprising:
  one emulsifier 1;
  one expansion nozzle 2;
  one separator 3;
  one diffuser 4 for the recompression of the liquid.

The liquid enters the first sequence $S_1$ of the system at 5, traverses all the series sequences and exits from sequence $S_n$ at 6 after increasing its pressure at every sequence.

The gas at pressure $p_n$ and to be dissolved in the liquid enters sequence $S_n$ at 7, is emulsified in the liquid in emulsifier $1_n$ and imparts to the liquid part of its energy by expanding in corresponding nozzle $2_n$, thus circulating in the same direction as the liquid. Separator $3_n$ separates the gas from the liquid, the gas exiting from sequence $S_n$ by tubing $8_n$ and being reinjected into the emulsifier of the previous sequence $S_{n-1}$ through the conduit, and so forth, finally exiting to the ambient atmosphere through duct 9 placed at the exhaust of separator 3.

FIG. 4 shows a system comprising intermediary capacities. A group of three sequences $S_1$, $S_2$, $S_3$ is shown in diagrammatic form, separated from another group of two sequences $S_4$ and $S_5$ by a tank or reservoir 10 filled with a liquid at intermediary pressure. The liquid enters at 5, successively traverses the three sequences $S_1$, $S_2$, $S_3$ and at the exit of $S_3$ is introduced in dwell space or reservoir 10 which is of such volume that the liquid may stay in it for a time interval sufficient for the gas dissolved therein in the three sequences $S_1$, $S_2$, $S_3$ to effect its reaction.

Thereupon the liquid is introduced in the ensuing sequences $S_4$ and $S_5$ whence it exits at 6 again saturated with reactive gas.

The gas to be dissolved in and to react chemically with the liquid is introduced at 7 in sequence $S_5$, from where it exits at the center of separator $3_5$, then is reintroduced successively in sequences $S_4$, $S_3$, $S_2$ and $S_1$ to be expelled (vented) through duct 9.

Clearly a number larger than one of intermediary dwell spaces may also be used if the conditions of reaction were to so require.

It will furthermore be observed that the end sequences $S_1$ and $S_n$ are special ones because sequence $S_1$ comprises liquid intake and gas exhaust whereas sequence $S_n$ comprises gas intake and liquid exhaust following its systematic treatment in the series of sequences.

Thus the expert may introduce multiple variations to the methodical system (sic) of the invention without thereby leaving the scope of the invention defined above.

SPECIFIC EXAMPLE

As an example, the results of a test corresponding to two sequences S1 and S2 will be given below. This experiment was meant to represent treating used water flowing at a rate of 2 liter/sec with ozone-charged air flowing at a rate of 16 gm/sec.

The air entered sequence S2 in emulsifier $1_2$ (see FIG. 1) at pressure $p_2$ of 1.8 bars corresponding to that of an ozone generator.

The water entered sequence S1 at a pressure of 1.4 bars absolute, i.e. at $p_1$ its stopping pressure being 1.8 bars, corresponding to a rate 9 meter/sec.

As regards emulsifier $1_1$ of sequence 1, the air from separator $3_2$ of the next sequence also arrived at a pressure of $p_1 = 1.4$ bars and the vacuum ratio (= volume of gas to total volume) at the exit of emulsifier $1_1$ was 0.83. The emulsion rate at the exit of nozzle $2_1$ was 15 meters/sec.

The air left separator $1_3$ outside the facility at atomspheric pressure ($p'_1 = 1$ bar). The water was recompressed in diffusor $4_1$ at the exit of which its pressure was raised to 1.8 bars ($p2$), its stopping pressure being 2.2 bars. The water therefore entered emulsifier $1_2$ at the pressure of the air entering the facility. The emulsion formed and accelerated in nozzle $2_2$ had a vacuum coefficient of 0.79 and its bubbles were very fine, so that highly favorable conditions for dissolving ozone-charged air in the impurity-laden water were obtained.

As regards separator $3_2$, air and water were separated at a pressure $p'_2$ of 1.4 bars, the water — as stated above — being reinjected in emulsifier $1_1$ of the preceding sequence S1.

The following equations were well obeyed:

$$p'_2 = p_1$$

$$p_2 + p'_1 = 2p_1$$

I claim:
1. A process for establishing thorough and methodical contact between a gas and a liquid such as in particular are likely to react with each other, said process involving changes in the gas and in the liquid in sequences, each sequence comprising the following stages:
   (a) emulsifying, at a given pressure p, a flow of gas and a flow of liquid,
   (b) expanding the resulting mixture to a pressure p' thereby accelerating the same,
   (c) separating the gas from the liquid at pressure p',
   (d) recompressing liquid with deceleration of the same, the expansion work of the gas being thereby transferred to the liquid,
   the liquid and the gas being made to circulate in two circuits on the whole in opposite directions in a plurality of sequences $S_1 \ldots S_{i-1}$, $S_i$, $S_{i+1} \ldots S_n$, the liquid being introduced in sequence $S_1$ and the gas in sequence $S_n$, and the liquid being expelled from the end of stage (d) of sequence $S_i$ into stage (a) of next sequence $S_{i+1}$ at a higher pressure and higher total energy than the pressure and energy at the inlet of stage (a) of sequence $S_i$ and the gas separated from the liquid in stage (c) of sequence $S_{i+1}$ being introduced in stage (a) of sequence $S_i$ at the same pressure as the pressure of the liquid and said gas introduced at stage (a) of sequence $S_i$ moving in the same direction as the liquid introduced at stage (a) of sequence Si, the liquid being expelled from the last sequence $S_n$ at a pressure higher than the pressure of the gas introduced in said sequence and the gas being expelled from the first sequence $S_1$ at a pressure lower than the pressure of the liquid introduced in said first sequence,
   the process being further characterized in that the pressures $p_1 \ldots p_i \ldots p_n$ of the liquid and the pressures $p'_1 \ldots p'_i \ldots p'_n$ of the gas at the exit of each of sequences $S_1 \ldots S_i \ldots S_n$ are related as follows with regard to unit sequences $S_{i-1} \ldots S_i$, $S_{i+1}$, $S_{i+2}$

$$p_{i-1} = p'_i$$

$$p_i = p'_{i+1}$$

$$p_{i+1} = p'_{i+2}$$

and so forth, thereby promoting a stepwise transfer of the energy of the gas into the liquid.

2. A process as defined in claim 1, characterized in that at any point of the liquid circuit external to said sequences, part of the liquid is tapped to be evacuated or recycled in a prior sequence, including end sequence $S_n$.

3. A process as defined in claim 1, characterized in that at any point of the liquid circuit external to said sequences, a fresh liquid identical with the circulating one, or another treatment liquid, is introduced to achieve complementary reaction between the liquid and the gas introduced.

4. A process as defined in claim 1 in which the liquid having contacted the gas in one or several sequences is made to go through a tank, the volume of said tank being large enough to allow partial or complete reaction at the center of the liquid prior to its introduction into the following sequence.

5. A process as defined in claim 1, characterized in that the pressures are related as follows:

$$p_i + p'_{i+1} = 2 p_{i-1}$$

$$p_{i+1} + p'_i = 2 p_i$$

and so forth.

* * * * *